(12) United States Patent
White

(10) Patent No.: US 6,725,743 B2
(45) Date of Patent: Apr. 27, 2004

(54) VEHICLE AXLE VENT TUBE

(75) Inventor: Jay D. White, Massillon, OH (US)

(73) Assignee: The Boler Company, Itasca, IL (US)

( * ) Notice: Subject to any disclaimer, the term of this patent is extended or adjusted under 35 U.S.C. 154(b) by 46 days.

(21) Appl. No.: 10/141,053

(22) Filed: May 7, 2002

(65) Prior Publication Data

US 2002/0166411 A1 Nov. 14, 2002

Related U.S. Application Data

(60) Provisional application No. 60/290,554, filed on May 11, 2001.

(51) Int. Cl.[7] ............................................... G05G 25/04
(52) U.S. Cl. ....................................................... 74/607
(58) Field of Search .......................... 74/606 R, 606 A, 74/607; 464/17

(56) References Cited

U.S. PATENT DOCUMENTS

| | | |
|---|---|---|
| 3,314,306 A | 4/1967 | Barclae |
| 4,557,526 A | 12/1985 | Smith |
| 5,024,345 A | 6/1991 | Deweerdt |
| 5,505,525 A * | 4/1996 | Denton .................... 301/108.4 |
| 5,724,864 A * | 3/1998 | Rodgers et al. |
| 6,024,417 A | 2/2000 | Jones, II et al. |
| 6,123,175 A | 9/2000 | Fett |
| 6,145,559 A * | 11/2000 | Ingram, II .................. 152/417 |

* cited by examiner

Primary Examiner—David A. Bucci
Assistant Examiner—Vicky A. Johnson
(74) Attorney, Agent, or Firm—Buckingham, Doolittle & Burroughs, LLP; David P. Dureska

(57) ABSTRACT

A vent tube for hollow axles of heavy-duty vehicles such as semi-trailers releases built-up air pressure from the wheel hub and axle while preventing ingress of contaminants into the axle and hub. The vent tube includes a tubular portion preformed from a flexible material into a generally coiled configuration. The tubular portion is biased to the coiled state so that when stretched about the axle and released, it firmly grips the axle without the need for fasteners. One end of the tubular portion includes a fitting for plumbing into the axle and the opposite end includes a one-way check valve such as a duck bill. The vent tube is disposed in a protected location within the hollow beam of the vehicle suspension assembly, and on a relatively stress-free location of the axle within a window of an axle sleeve.

12 Claims, 1 Drawing Sheet

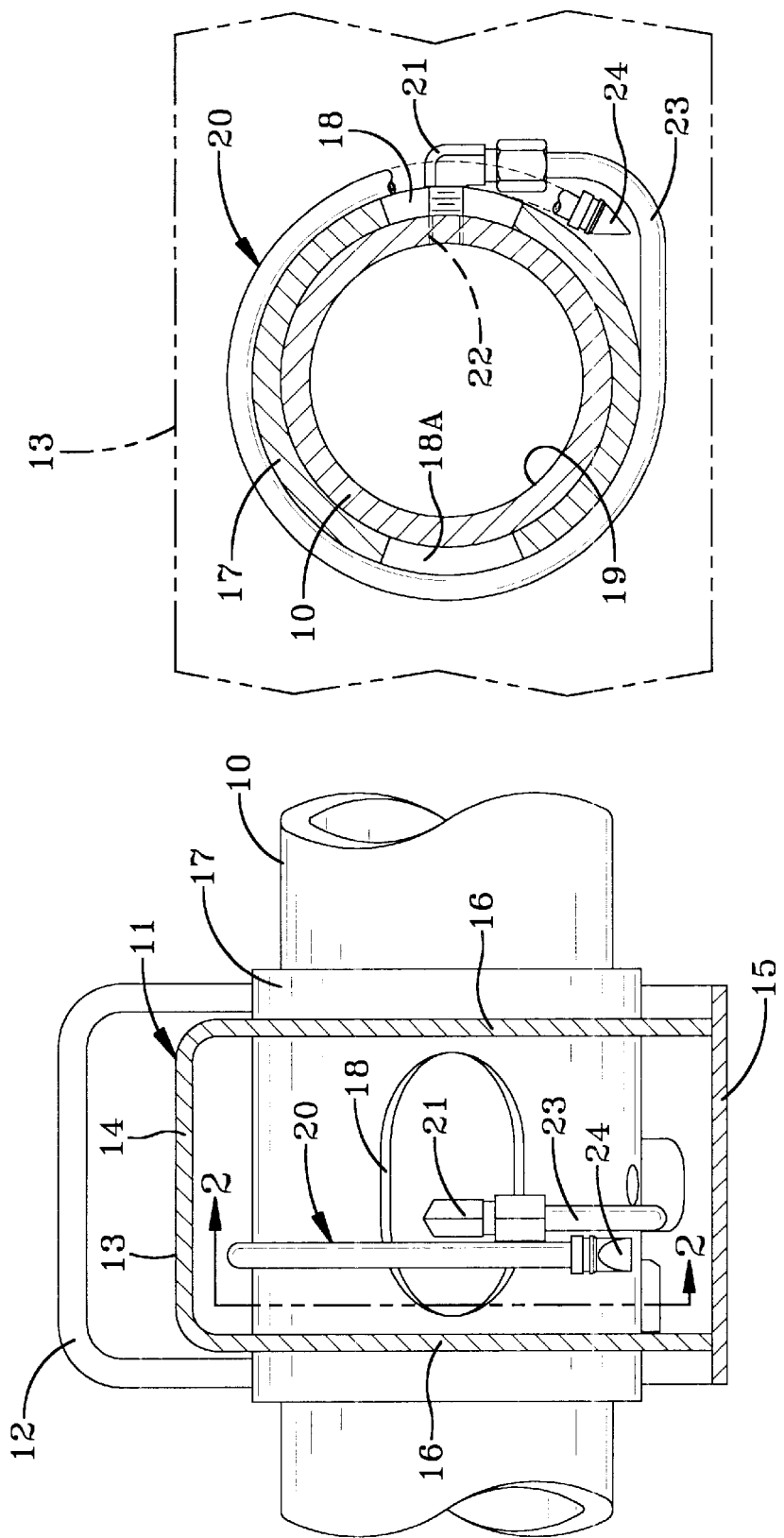

US 6,725,743 B2

VEHICLE AXLE VENT TUBE

This application claims the benefit of provisional application No. 60/290,554 filed May 11, 2001.

BACKGROUND OF THE INVENTION

The invention relates to vent tubes for axles, and in particular to an axle vent tube for heavy-duty vehicles such as semi-trailers. More particularly, the invention is directed to a tube formed in a generally circular configuration and which is disposed about and substantially surrounds a hollow axle, so that one end of the tube is tapped into the axle and the opposite end of the tube includes a valve, whereby pressure build-up in the vehicle axle and wheel hub is released while preventing contaminants from entering the axle and hub through the tube, thereby extending the life of the hub seals and wheel bearings themselves.

FIELD OF THE INVENTION

Automatic tire pressure inflation systems for commercial heavy vehicles such as semi-trailers and full trailers have grown in popularity in recent years. To meet the demand, numerous suppliers have introduced tire inflation systems having various designs. One such design approach is to run an air pressure supply line through the hollow axle to feed a rotary union located at the end of the axle spindle or wheel hubcap. The rotary union is an airtight rotating seal that enables fluid communication between the non-rotating axle and the rotating tire. Failure of the supply line or rotary union typically causes a sudden air pressure build-up in the hollow axle and wheel hub, which if left unrelieved, can lead to wheel hub seal failure. Such seal failure in turn usually leads to a loss of bearing lubrication and subsequent rapid wheel bearing failure, resulting in an expensive repair. Also, even a small increase in pressure from a slow leak inside the axle or hub can greatly reduce the hub seal life.

Many of the aforementioned tire inflation systems incorporate a venting device or system in the wheel hubcap to relieve such excess pressure. However, many of these hubcap venting systems lack the robustness to adequately prevent contaminants from entering the hub, thus failing to offer adequate protection to the bearing lubricant and bearings. More particularly, due to the exposed location of these hubcap venting systems on the vehicle, contaminants such as water from a high-pressure truck wash have been known to breach many of these prior art hubcap venting systems.

Other known prior art axle vent systems or devices include drive axle vent tubes which are installed by tapping one end of a tube or hose into the axle and allowing the tube to hang vertically from the axle, with the opposite end of the hose being open to atmosphere. Vent tubes are needed on drive axles because the gears inside the axle generate heat during operation, thus causing the air inside the axle to expand. However, such a device is less than efficient in preventing contaminants, such as water, from entering the axle. Another known prior art axle vent system involves tapping one end of a rubber hose or tube usually into the top central portion of an axle, and fastening the hose in a manner, such as to the vehicle frame, that allows the hose to extend vertically upwardly from the axle, bend at its highest point and then wrap back upon itself vertically downwardly. Others of this type of vent tube are free-standing and the downwardly-extending portion of the tube simply is secured in some manner, such as with a common tie wrap, to the upwardly-extending portion. Again, however, the end of the hose opposite from the end tapped into the axle is open and is inadequate in preventing contaminants from entering the axle. For example, if a semi-trailer having such an axle vent device backed into a dock which was partially submerged in water and the axle vent tube became submerged, water could enter the axle. Also, its typical location at the central portion of the axle makes it susceptible to damage or even being ripped off of the axle by flying debris or the like during operation of the vehicle. The risk of damage is especially high for the freestanding type of vent tube, and is even subject to damage from the force of the wind it encounters during vehicle operation. The top of the axle at any location between the suspension assembly attachment points, that is, generally the central portion of the axle, also is a relatively high-stress portion of the axle, and drilling a hole at that location could undesirably weaken the axle which could lead to further axle damage or even axle failure. This is particularly true on a trailing arm-type suspension assembly where the axle supplies the auxiliary roll stiffness for the suspension assembly.

Applicant has solved the above-noted problems with its axle vent tube of the present invention, which preferably utilizes a tube preformed into at least a single loop capable of substantially surrounding the axle, and having an inside diameter slightly smaller than the outside diameter of the axle. The tube preferably is formed of a material so that when stretched around the axle and released, it firmly grips the axle, thus eliminating the need for fastening hardware. One end of the tube is plumbed to an opening formed in the axle and communicates with the hollow axle interior, and the opposite end of the tube includes a one-way check valve or duck bill which communicates with atmosphere, the latter of which being well-known in the valve art. The valve allows pressure build-up in the axle to vent while preventing contaminants from entering the axle and wheel hub through the vent tube. The circular disposition of the tube about the axle also aids in preventing contaminants from entering the axle because portions of the tube are vertically disposed, and gravity thus operates to assist in preventing travel of contaminants through the tube and into the axle interior, which is especially important if the duck bill should fail for any reason. The vent tube is protected from damage by disposing it on the axle at a protected location within the suspension assembly beam, thus eliminating the need for add-on shields and the like, and at a low-stress location on the axle itself.

SUMMARY OF THE INVENTION

Objectives of the present invention include providing a vent tube for a vehicle axle which is capable of venting undesirable excess pressure from the axle and wheel hub.

Another objective of the present invention is to provide such an axle vent tube which prevents contaminants from entering the axle.

An additional objective of the present invention is to provide such an axle vent tube which is protected by existing vehicle structures to minimize the possibility of damage to and/or failure of the tube.

Still a further objective of the present invention is to provide such an axle vent tube which is simple, economical, lightweight, durable in use, and easy to install, maintain, and replace.

These objectives and advantages are obtained by the vehicle axle vent tube of the present invention, the general nature of which can be stated as including a device for venting to atmosphere built-up air pressure from a hollow vehicle axle and a wheel hub, the device including a conduit having first and second ends, at least a portion of the conduit being vertically oriented, means for mounting the conduit first end on the axle to create fluid communication between the axle hollow interior and the conduit, and means disposed on the conduit second end to enable flow of the built-up air pressure to atmosphere and to substantially prevent ingress of contaminants into the axle and the hub.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 1 is a fragmentary rear-end view of the vent tube of the present invention shown operatively attached to a heavy-duty vehicle axle at a location within a suspension beam shown in section; and FIG. 2 is a sectional view taken along lines 2—2 of FIG. 1, with hidden parts represented by broken lines, and illustrating the beam within which the vent tube is mounted as a fragmentary phantom structure.

Similar numerals refer to similar parts throughout the drawings.

DESCRIPTION OF THE PREFERRED EMBODIMENT

So that the vent tube of the present invention can be best understood, a typical environment in which it is intended to be used will be described first. Most heavy-duty vehicles such as semi-trailers have an axle/suspension system, wherein a vehicle axle 10 (FIG. 1) having a hollow interior 19 (FIG. 2) extends between and is captured in a pair of spaced-apart suspension assemblies 11 (only one shown). Of course, wheel hubs, wheels and tires (not shown) are mounted on each end of axle 10. Suspension assemblies 11 can be of either the leading arm beam-type or trailing arm beam-type, or even of the spring beam-type. For the sake of economy, only trailing arm beam-type suspension assembly 11 will be described. A hanger 12 is securely mounted on and depends from the vehicle frame (not shown). The front end of a trailing beam 13 includes a bushing assembly (not shown) which is pivotally mounted on hanger 12 in a well-known manner. Beam 13 typically is a robust steel box-like structure having top and bottom walls 14, 15, respectively, and a pair of spaced-apart sidewalls 16 which interconnect the top and bottom walls to form the generally rectangular-shaped hollow box beam structure. An axle wrap or sleeve 17 extends through and is welded to a pair of complementary-sized and shaped openings (not shown) formed in beam sidewalls 16 and extends outwardly a short distance from each of the sidewalls. Axle 10 in turn is passed through sleeve 17 and the axle is welded to the sleeve by continuous welds (not shown) at windows 18, 18A formed generally in the rear and front quadrants, respectively, of the sleeve.

The structure, mounting and operation of the vent tube of the present invention now will be described. The vent tube of the present invention is indicated generally at 20 and is shown in FIGS. 1 and 2 mounted on axle 10. Vent tube 20 includes a conduit or tubular portion 23 preferably pre-molded or preformed of Synflex in a coil or looped configuration. Synflex is a nylon composition having good low temperature flex properties. Tubular portion 23 preferably has an outside diameter of about three-eighths (⅜) of an inch. A length of coiled tubular portion 23 sufficient to substantially surround axle sleeve 17 preferably has an inside diameter slightly smaller than the outside diameter of the sleeve. When stretched about axle sleeve 17, tubular portion 23 is biased to the coiled configuration and firmly grips the sleeve, thus eliminating the need for any fastening hardware. One end of tubular portion 23 has a threaded fitting 21 attached thereto, which in turn is disposed in a complementary-sized and shaped threaded opening 22 formed in axle 10 at a location within sleeve rear window 18. Fitting 21 communicates with axle hollow interior 19 and with tubular portion 23. It is understood that axle 10 is drilled and tapped in a well-known manner to form opening 22 to accept fitting 21. It is further understood that fitting 21 could be tapped within sleeve front window 18A and other types of fittings and openings 22 could be utilized without affecting the overall inventive concept. The opposite end of tubular portion 23 preferably is fitted with a duck bill-type one-way check valve 24, which communicates with the tubular portion and is well-known in the valve art.

In accordance with one of the important features of the present invention, it can be understood from the above description and FIGS. 1 and 2, that the location of vent tube 20 of the present invention at axle sleeve window 18 within beam 13, protects the tube from wind and debris such as flying stones and the like encountered during operation of the semi-trailer over-the-road, thus minimizing the chance of possible damage to and resulting inoperability of the vent tube. Locating vent tube 20 within an existing vehicle structure also eliminates the need for undesirable add-on structures such as shields, and the like. Moreover, axle opening 22 for receiving vent tube fitting 21 is disposed within window 18 which is the point of attachment of axle 10 to sleeve 17 via a continuous weld. These structures and arrangements of parts are located at a relatively low-stress area of axle 10 within window 18, thereby making it a favorable location to invade axle 10 with opening 22 without a high probability of weakening the axle. The area of axle 10 within front window 18A carries the same advantages.

Vent tube 20 of the present invention operates in the following manner. When pressure in axle hollow interior 19 and the wheel hub (not shown) with which the axle interior communicates increases to an unacceptable level, which typically is defined as a pressure above atmospheric pressure, such as due to the failure of a tire inflation air pressure supply line or rotary union for that supply line on vehicles equipped with such an inflation system, failure to vent the excessive air pressure could result in wheel hub seal failure, leading to loss of bearing lubrication and rapid bearing failure. Other conditions can also lead to a pressure build-up in axle 10, such as the natural rolling friction of the bearings, tire rolling resistance and friction from operation of the brake drum or rotor. Each of these conditions contributes to warming of the wheel hub and its internal cavity. Such heat in turn causes the air contained in the hub and hollow axle to expand and increase its pressure. Changes in elevation during travel of the vehicle can even increase pressure. Duck bill-type one-way check valve 24 of vent tube 20 enables such built-up pressure to vent to atmosphere while blocking any contaminants, such as water or debris, from entering axle hollow interior 19 and the wheel hub. Moreover, due to the fact that sections of vent tube tubular portion 23 are vertically oriented, gravity assists in preventing the ingress of contaminants into axle interior 19, and is especially important in the event of failure of check valve 24.

More specifically, a pressure differential is created across one-way check valve 24 when pressure increases within axle 10 and the wheel hub to a level above atmospheric pressure.

This pressure differential causes one-way valve 24 to open to atmosphere and cause an air pressure outflow to relieve the pressure build-up in axle hollow interior 19 and the wheel hub. The resulting lowered pressure in the hub reduces the wheel hub lip seal contact pressure, thereby extending the life of the seal. One-way check valve 24 closes once the pressure differential has been relieved, thus preventing water and/or contaminants from moving through tubular portion 23 of vent tube 20 and entering axle hollow interior 19 and the wheel hub.

It is understood that tubular portion 23 of vent tube 20 of the present invention could be formed of other materials which preferably have the requisite strength and good low temperature flexibility characteristics, such as nitrile rubber having reinforcing braiding. Also, although the preferred diameter of tubular portion 23 is three-eighths (⅜) of an inch when used in an application where the vehicle utilizes a tire inflation system, virtually any diameter tube down to the size of a pinhole would assist in relieving built-up pressure in axle 10. It is further contemplated that vent tube 20, rather than utilizing a coiled tubular portion 23 which clings to the axle or its sleeve, could employ a straight length of tubing that could be wound about the axle sleeve and fastened thereto using a clamp, glue, or other means. Also, it is contemplated that multiple loops of tubular portion 23 could be employed, or tubular portion 23 merely could consist of a short vertical straight tube or hose which does not substantially surround the axle, without affecting the overall concept of the present invention. Although not preferred, it is contemplated that vent tube 20 could be mounted by other means and at other locations on the axle where it might be protected by other components of the suspension assemblies or even the vehicle frame or accessories for the vehicle, or a shield could be utilized to protect the vent tube if it is mounted on the axle in an otherwise unprotected location. Also, vent tube 20 can be utilized on axles not employing axle sleeves, and in connection with other types of suspension assemblies such as the spring beam-type having a box-like axle seat for protecting the vent tube. It is understood that vent tube 20, although preferably installed on an axle after attachment of the axle to suspension assemblies, could be installed on the axle first, followed by capture of the axle by the suspension assemblies. Also, it should be noted that the vertical portions of tube 23 serve as a secondary protection against ingress of contaminants into hollow axle 10 and the wheel hub should duck bill 24 be damaged and fail. Finally, it is understood that in applications other than for axles that employ a tire inflation system and the attendant higher pressure outflows, duck bill or one-way check valve 24 could be replaced with a simple filter or screen.

Thus, it can be seen that present invention axle vent tube 20, because of its compact design, can be mounted in a protected location within beam 13 of suspension assembly 11 and at a relatively stress-free location on axle 10. Due to the material used to form tubular portion 23 of vent tube 20, and its flexible looped configuration, tube 23 constricts about axle sleeve 17, thus eliminating the need for fasteners. It is understood that the combination of vertical portions of vent tube 20 and one-way check valve 24 prevent contaminants from entering the tube, axle hollow interior 19 and the wheel hub, yet the valve allows unwanted pressure build-up therein to vent to atmosphere. It is also important to note that vent tube 20 is simple, lightweight, low cost, durable, and easy to install, maintain, and replace. Finally, it is understood that vent tube 20 of the present invention could be used to vent axles of heavy-duty vehicles other than semi-trailers and full trailers.

Accordingly, the improved axle vent tube of the present invention is simplified, provides an effective, safe, inexpensive, and efficient device which achieves all of the enumerated objectives, provides for eliminating difficulties encountered with prior axle venting devices and systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved axle vent tube is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A device for venting to atmosphere built-up air pressure from a hollow vehicle axle and a wheel hub, said device including:
   a) a conduit having first and second ends, at least a portion of said conduit being vertically oriented, said conduit being mounted within a hollow beam of a suspension assembly of said vehicle;
   b) means for mounting said conduit first end on said axle to create fluid communication between said axle hollow interior and said conduit; and
   c) means disposed on said conduit second end to enable flow of said built-up air pressure to atmosphere and to substantially prevent ingress of contaminants into said axle and said hub.

2. A device for venting to atmosphere built-up air pressure from a hollow vehicle axle and a wheel hub, said axle including top, bottom, front, and rear quadrants, said device including:
   a) a conduit having first and second ends, at least a portion of said conduit being vertically oriented;
   b) means for mounting said conduit first end on said axle at a location substantially remote from said top and bottom quadrants to create fluid communication between said axle hollow interior and said conduit; and
   c) means disposed on said conduit second end to enable flow of said built-up air pressure to atmosphere and to substantially prevent ingress of contaminants into said axle and said hub.

3. A device for venting to atmosphere built-up air pressure from a hollow vehicle axle and a wheel hub, said axle including top, bottom, front, and rear quadrants, said device including:
   a) a conduit having first and second ends, at least a portion of said conduit being vertically oriented;
   b) means for mounting said conduit first end on said axle on a selected one of said axle front and rear quadrants to create fluid communication between said axle hollow interior and said conduit; and
   c) means disposed on said conduit second end to enable flow of said built-up air pressure to atmosphere and to substantially prevent ingress of contaminants into said axle and said hub.

4. A device for venting to atmosphere built-up air pressure from a hollow vehicle axle and a wheel hub, said axle and an axle sleeve each including top, bottom, front, and rear quadrants, said axle sleeve being formed with a window opening in each of said front and rear quadrants, said axle being mounted within said axle sleeve by a continuous weld disposed in each of said window openings, said device including:
   a) a conduit having first and second ends, at least a portion of said conduit being vertically oriented;
   b) means for mounting said conduit first end on said axle within a selected one of said front and rear window openings to create fluid communication between said axle hollow interior and said conduit; and
   c) means disposed on said conduit second end to enable flow of said built-up air pressure to atmosphere and to substantially prevent ingress of contaminants into said axle and said hub.

5. A device for venting to atmosphere built-up air pressure from a hollow vehicle axle and a wheel hub, said device including:
   a) a conduit having first and second ends, at least a portion of said conduit being vertically oriented, said conduit being a substantially flexible tube preformed and biased to a coiled configuration, said tube coiled configuration including at least one loop;
   b) means for mounting said conduit first end on said axle to create fluid communication between said axle hollow interior and said conduit; and
   c) means disposed on said conduit second end to enable flow of said built-up air pressure to atmosphere and to substantially prevent ingress of contaminants into said axle and said hub.

6. A device for venting to atmosphere built-up air pressure from a hollow vehicle axle and a wheel hub, said device including:
   a) a conduit having first and second ends, at least a portion of said conduit being vertically oriented, said conduit being a substantially flexible tube preformed and biased to a coiled configuration, said tube coiled configuration including at least one loop, said tube constricting about said axle and being secured about said axle, said tube being free of fasteners for securing said tube to said axle;
   b) means for mounting said conduit first end on said axle to create fluid communication between said axle hollow interior and said conduit; and
   c) means disposed on said conduit second end to enable flow of said built-up air pressure to atmosphere and to substantially prevent ingress of contaminants into said axle and said hub.

7. A device for venting to atmosphere built-up air pressure from a hollow vehicle axle and a wheel hub, said device including:
   a) a conduit having first and second ends, at least a portion of said conduit being vertically oriented, said conduit being a substantially flexible tube preformed and biased to a coiled configuration, said tube coiled configuration including at least one loop, said tube being formed of Synflex and having a diameter of about three-eighths of an inch;
   b) means for mounting said conduit first end on said axle to create fluid communication between said axle hollow interior and said conduit; and
   c) means disposed on said conduit second end to enable flow of said built-up air pressure to atmosphere and to substantially prevent ingress of contaminants into said axle and said hub.

8. A device for venting to atmosphere built-up air pressure from a hollow vehicle axle and a wheel hub, said axle including top, bottom, front, and rear quadrants, said device including:
   a) a conduit having first and second ends, at least a portion of said conduit being vertically oriented;
   b) means for mounting said conduit first end on said axle at a location substantially remote from said top and bottom quadrants, said conduit first end including a threaded fitting for tapping into a threaded opening formed in said axle for mounting said conduit first end on said axle to create fluid communication between said axle hollow interior and said conduit; and
   c) means disposed on said conduit second end to enable flow of said built-up air pressure to atmosphere and to substantially prevent ingress of contaminants into said axle and said hub.

9. A device for venting to atmosphere built-up air pressure from a hollow vehicle axle and a wheel hub, said axle including top, bottom, front, and rear quadrants, said device including:
   a) a conduit having first and second ends, at least a portion of said conduit being vertically oriented;
   b) means for mounting said conduit first end on said axle at a location substantially remote from said top and bottom quadrants to create fluid communication between said axle hollow interior and said conduit; and
   c) a one-way check valve disposed on said conduit second end to enable flow of said built-up air pressure to atmosphere and to substantially prevent ingress of contaminants into said axle and said hub.

10. A device for venting to atmosphere built-up air pressure from a hollow vehicle axle and a wheel hub, said axle including top, bottom, front, and rear quadrants, said device including:
    a) a conduit having first and second ends, at least a portion of said conduit being vertically oriented;
    b) means for mounting said conduit first end on said axle at a location substantially remote from said top and bottom quadrants to create fluid communication between said axle hollow interior and said conduit; and
    c) a duck bill disposed on said conduit second end to enable flow of said built-up air pressure to atmosphere and to substantially prevent ingress of contaminants into said axle and said hub.

11. A device for venting to atmosphere built-up air pressure from a hollow vehicle axle and a wheel hub, said axle including top, bottom, front, and rear quadrants, said device including:
    a) a conduit having first and second ends, at least a portion of said conduit being vertically oriented;
    b) means for mounting said conduit first end on said axle at a location substantially remote from said top and bottom quadrants to create fluid communication between said axle hollow interior and said conduit; and
    c) a filter disposed on said conduit second end to enable flow of said built-up air pressure to atmosphere and to substantially prevent ingress of contaminants into said axle and said hub.

12. A device for venting to atmosphere built-up air pressure from a hollow vehicle axle and a wheel hub, said axle including top, bottom, front, and rear quadrants, said device including:

a) a conduit having first and second ends, at least a portion of said conduit being vertically oriented;

b) means for mounting said conduit first end on said axle at a location substantially remote from said top and bottom quadrants to create fluid communication between said axle hollow interior and said conduit; and c) a screen disposed on said conduit second end to enable flow of said built-up air pressure to atmosphere and to substantially prevent ingress of contaminants into said axle and said hub.

* * * * *